(12) United States Patent
Besier et al.

(10) Patent No.: US 11,999,326 B2
(45) Date of Patent: Jun. 4, 2024

(54) BRAKING SYSTEM WITH TWO PRESSURE SOURCES, AND METHOD FOR OPERATING A BRAKING SYSTEM WITH TWO PRESSURE SOURCES

(71) Applicant: Continental Teves AG & Co OhG, Frankfurt am Main (DE)

(72) Inventors: Marco Besier, Frankfurt am Main (DE); Stefan Drumm, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 313 days.

(21) Appl. No.: 17/054,672

(22) PCT Filed: May 15, 2019

(86) PCT No.: PCT/EP2019/062509
§ 371 (c)(1),
(2) Date: Nov. 11, 2020

(87) PCT Pub. No.: WO2019/224077
PCT Pub. Date: Nov. 28, 2019

(65) Prior Publication Data
US 2021/0053540 A1    Feb. 25, 2021

(30) Foreign Application Priority Data
May 24, 2018    (DE) .................... 10 2018 208 223.5

(51) Int. Cl.
*B60T 13/74*    (2006.01)
*B60T 8/17*    (2006.01)
(Continued)

(52) U.S. Cl.
CPC ................. *B60T 13/58* (2013.01); *B60T 8/17* (2013.01); *B60T 15/028* (2013.01); *B60T 7/042* (2013.01);
(Continued)

(58) Field of Classification Search
CPC ............. B60T 13/745; B60T 2270/402; B60T 2270/403; B60T 2270/404;
(Continued)

(56) References Cited

U.S. PATENT DOCUMENTS 6,410,993 B1    6/2002    Giers
7,302,328 B2    11/2007    Kato et al.
(Continued)

FOREIGN PATENT DOCUMENTS

CN    102481914 A    5/2012
DE    19717686 A1    10/1998
(Continued)

OTHER PUBLICATIONS

Machine translation of DE 103 19 338, retrieved Aug. 26, 2023 (Year: 2023).*

(Continued)

*Primary Examiner* — Bradley T King
(74) *Attorney, Agent, or Firm* — BUCHANAN INGERSOLL & ROONEY PC

(57) ABSTRACT

A braking system including four hydraulically actuatable wheel brakes. A normally closed outlet valve is assigned to each wheel brake and a normally open inlet valve is assigned to each wheel brake. Two pressure supply devices are provided for active pressure build-up in the wheel brakes. A first and a second brake circuit are hydraulically configured with two wheel brakes respectively, wherein in each brake circuit a respective pressure supply device is hydraulically connected to two wheel brakes. A first and a second control (Continued)

and regulating unit are provided, wherein the first control and regulating unit electrically controls the pressure supply device of the first brake circuit, and wherein the second control and regulating unit hydraulically controls the pressure supply device of the second brake circuit, and the two control and regulating units are connected together via a data interface.

17 Claims, 4 Drawing Sheets

(51) Int. Cl.
  *B60T 13/58* (2006.01)
  *B60T 15/02* (2006.01)
  *B60T 7/04* (2006.01)
  *B60T 8/40* (2006.01)
  *B60T 13/16* (2006.01)

(52) U.S. Cl.
  CPC ............ *B60T 8/4081* (2013.01); *B60T 13/16* (2013.01); *B60T 13/161* (2013.01); *B60T 2220/04* (2013.01); *B60T 2270/402* (2013.01); *B60T 2270/403* (2013.01); *B60T 2270/404* (2013.01); *B60T 2270/82* (2013.01)

(58) Field of Classification Search
  CPC ........... B60T 2270/413; B60T 2270/82; B60T 13/16; B60T 13/161; B60T 13/58; B60T 8/4081; B60T 8/17; B60T 7/042; B60T 15/028
  See application file for complete search history.

(56) References Cited

U.S. PATENT DOCUMENTS

| | | | |
|---|---|---|---|
| 9,315,180 | B2 | 4/2016 | Jungbecker et al. |
| 9,415,758 | B2 | 8/2016 | Drumm et al. |
| 10,137,877 | B2 | 11/2018 | Feigel et al. |
| 10,358,119 | B2 | 7/2019 | Besier et al. |
| 2002/0050739 | A1* | 5/2002 | Koepff ................ B60T 8/348 303/122.09 |
| 2013/0080016 | A1* | 3/2013 | Bohn .................. B60T 8/176 701/78 |
| 2014/0131154 | A1* | 5/2014 | Ganzel ................ B60T 13/588 303/14 |
| 2014/0152085 | A1* | 6/2014 | Biller .................. B60T 8/4081 303/14 |
| 2014/0203626 | A1* | 7/2014 | Biller .................. B60T 13/58 303/14 |
| 2015/0035353 | A1* | 2/2015 | Drumm ............... B60T 8/3655 303/15 |
| 2016/0009263 | A1* | 1/2016 | Feigel ................. B60T 11/224 303/15 |
| 2016/0009267 | A1* | 1/2016 | Lesinski, Jr. ........ B60T 7/12 303/10 |
| 2016/0023644 | A1* | 1/2016 | Feigel ................. B60T 8/4081 303/3 |
| 2016/0221554 | A1* | 8/2016 | Knechtges ............ B60T 7/042 |
| 2017/0129468 | A1* | 5/2017 | Besier ................. B60T 8/4086 |
| 2018/0290640 | A1* | 10/2018 | Johnson .............. B60T 13/662 |
| 2019/0031165 | A1 | 1/2019 | Besier et al. |
| 2019/0308601 | A1* | 10/2019 | Maj .................... B60T 7/042 |
| 2019/0344769 | A1* | 11/2019 | Zimmermann ....... B60T 8/326 |
| 2020/0276963 | A1* | 9/2020 | Zimmermann ...... B60T 13/686 |
| 2020/0307538 | A1* | 10/2020 | Ganzel ................ B60T 8/4081 |
| 2021/0031742 | A1* | 2/2021 | Drotleff .............. B60T 13/686 |
| 2021/0094523 | A1* | 4/2021 | Dinkel ................ B60T 8/343 |
| 2021/0380087 | A1* | 12/2021 | Di Stefano .......... B60T 7/042 |
| 2021/0388921 | A1* | 12/2021 | Maj .................... B60T 8/4045 |

FOREIGN PATENT DOCUMENTS

| | | | | |
|---|---|---|---|---|
| DE | 10319338 | A1 * | 11/2004 | ........... B60T 13/686 |
| DE | 602004002057 | T2 | 4/2007 | |
| DE | 102011122776 | | 1/2013 | |
| DE | 102012210809 | A1 | 1/2013 | |
| DE | 102013204778 | A1 | 9/2013 | |
| DE | 102013225809 | A1 | 8/2014 | |
| DE | 102013217954 | A1 * | 3/2015 | ........... B60T 8/4081 |
| DE | 102014225958 | A1 | 6/2016 | |
| DE | 102016203563 | A1 | 9/2017 | |
| DE | 102016213994 | A1 | 2/2018 | |
| WO | 2015032637 | A1 | 3/2015 | |
| WO | 2017148968 | A1 | 9/2017 | |

OTHER PUBLICATIONS

German Search Report for German Application No. 10 2018 208 223.5, dated May 22, 2019, with partial translation, 10 pages.
International Search Report and Written Opinion for International Application No. PCT/EP2019/062509, dated Jul. 29, 2019, with partial translation, 17 pages.
European Communication pursuant to Article 94(3) for European Application No. 19 725 101.0, dated Dec. 6, 2022 with translation, 9 pages.
Korean Notification of Reason for Refusal for Korean Application No. 10-2020-7033537, dated Mar. 10, 2022, with translation, 20 pages.
Chinese Office Action for Chinese Application No. 201980034637. 3, dated Jun. 13, 2022 with translation, 18 pages.
Korean Decision for Grant of Patent for Korean Application No. 10-2020-7033537, dated Sep. 28, 2022, with translation, 5 pages.
Chinese Office Action for Chinese Application No. 201980034637. 3, dated Jan. 20, 2023 with translation, 4 pages.

* cited by examiner

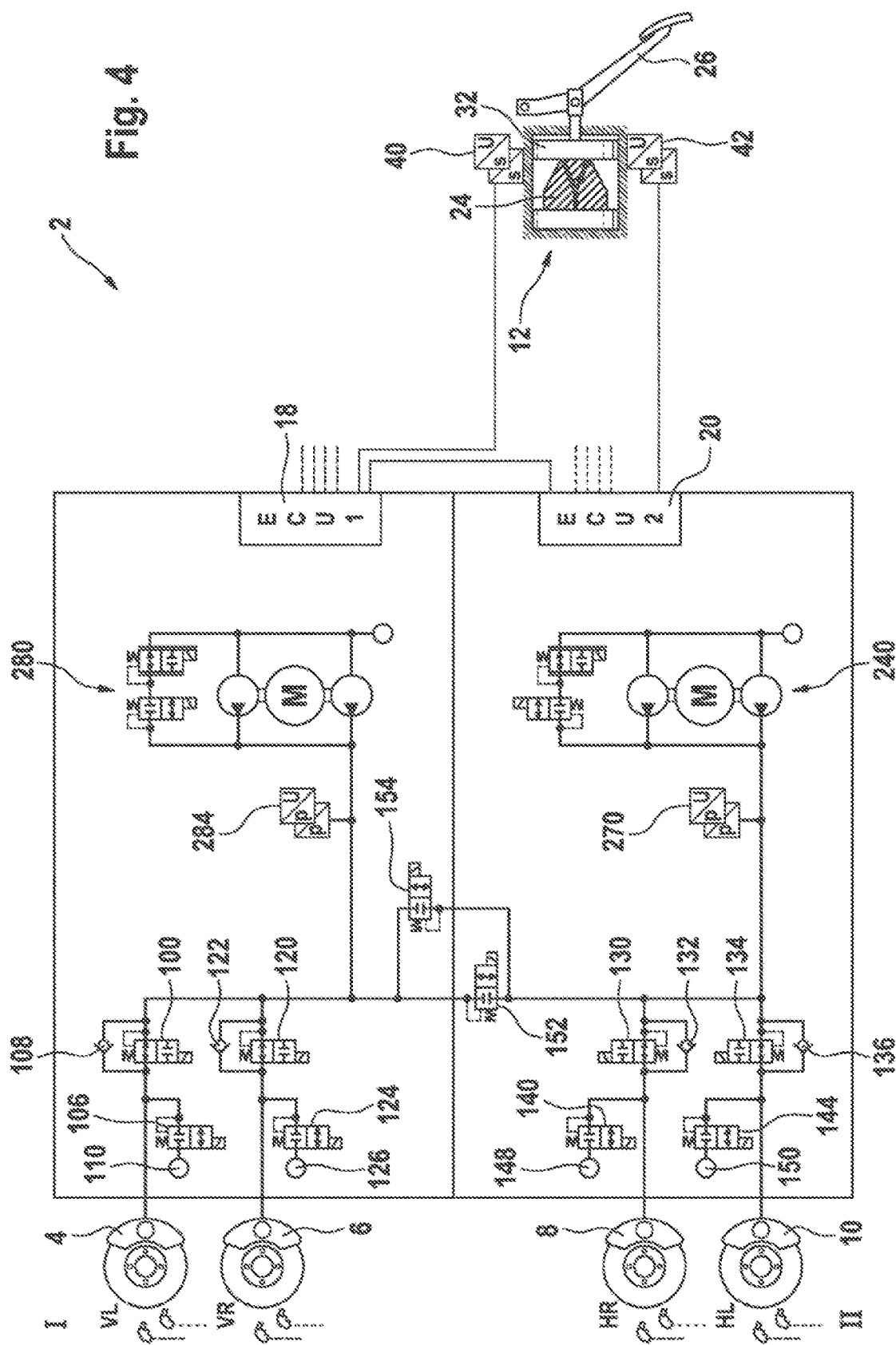

BRAKING SYSTEM WITH TWO PRESSURE SOURCES, AND METHOD FOR OPERATING A BRAKING SYSTEM WITH TWO PRESSURE SOURCES

CROSS REFERENCE TO RELATED APPLICATIONS

This application is the U.S. National Phase Application of PCT International Application No. PCT/EP2019/062509, filed May 15, 2019, which claims priority to German Patent Application No. 10 2018 208 223.5, filed May 24, 2018, the contents of such applications being incorporated by reference herein.

FIELD OF THE INVENTION

The invention concerns a braking system comprising four hydraulically actuatable wheel brakes, wherein a normally closed outlet valve is assigned to each wheel brake and a normally open inlet valve is assigned to each wheel brake, wherein two pressure supply devices are provided for active pressure build-up in the wheel brakes, wherein a first and a second brake circuit are hydraulically configured with two wheel brakes respectively, and wherein in each brake circuit a respective pressure supply device is hydraulically connected to two wheel brakes. The invention furthermore relates to a corresponding operating method.

BACKGROUND OF THE INVENTION

In electrohydraulic brake systems with the "brake-by-wire" operating mode, the driver is decoupled from direct access to the brakes. When the pedal is actuated, a pedal-decoupling unit and a simulator are usually actuated, the driver's braking intention being detected by a sensor system. The pedal simulator is used to give the driver a brake pedal feel which is as familiar as possible. The detected braking intention leads to the determination of a nominal braking torque, from which the nominal brake pressure for the brakes is then determined. The brake pressure is then built up actively in the brakes by a pressure supply device.

The actual braking is thus achieved by active pressure build-up in the brake circuits by means of a pressure supply device, which is activated by a control and regulating unit. By virtue of the brake pedal actuation being hydraulically decoupled from the pressure build-up, a large number of functionalities, such as ABS, ESC, TCS, slope launch assistance etc., can be implemented in a manner which is convenient for the driver in brake systems of this type.

The pressure supply device in the brake systems described above is also referred to as an actuator or hydraulic actuator. In particular, actuators are in the form of linear actuators, in which, for the pressure build-up, a piston is displaced axially into a hydraulic pressure compartment which is constructed in series with a rotation/translation mechanism. The motor shaft of an electric motor is converted by the rotation/translation mechanism into an axial displacement of the piston.

DE 10 2013 204 778 A1, incorporated herein by reference, has disclosed a "brake-by-wire" braking installation for motor vehicles which comprises a tandem brake master cylinder, which can be actuated by means of a brake pedal and the pressure spaces of which are in each case connected, separably by means of an electrically actuatable isolating valve, to a brake circuit with two wheel brakes, an activatable and deactivatable simulation device, which is hydraulically connected to the brake master cylinder, and an electrically controllable pressure supply device, which is formed by a cylinder-piston arrangement with a hydraulic pressure space, the piston of which is displaceable by an electromechanical actuator, wherein the pressure supply device is connected via two electrically actuatable activation valves to the inlet valves of the wheel brakes.

In brake systems of this kind, a mechanical and/or hydraulic fall-back level is usually provided, by means of which the driver can brake or halt the vehicle by muscle power by actuating the brake pedal if the "by-wire" operating mode fails or is disrupted. Whereas, in normal operation, the above-described hydraulic decoupling between brake pedal actuation and brake pressure build-up is realized by means of a pedal decoupling unit, in the fall-back level, this decoupling is eliminated, thus allowing the driver to directly displace brake fluid into the brake circuits. A switch is made to the fall-back level if it is no longer possible to build up pressure by means of the pressure supply device.

During normal operation, in the case of a power-assisted brake installation of this type, the driver actuates a pedal simulator, wherein this pedal actuation is detected by pedal sensors, and a corresponding pressure setpoint for the linear actuator for actuation of the wheel brakes is determined. An advancing movement of the linear actuator out of the rest position thereof into the pressure compartment displaces a brake fluid volume from the linear actuator via the open valves into the wheel brakes and thus brings about a pressure build-up. Conversely, the movement of the linear actuator back towards the rest position thereof leads to a reduction in pressure in the wheel brakes.

A stipulated system pressure is set by means of a suitable pressure controller or a suitable pressure control system, in which, for example, a speed controller is subordinate to the pressure controller. By-wire brake assemblies are also known in which two pressure provision devices are provided. For example, in each case one pressure provision device may build up pressure in one brake circuit.

SUMMARY OF THE INVENTION

An aspect of the invention is based on specifying a brake assembly of said type with two pressure supply devices which satisfies high demands with regard to fail-safe operation. It is furthermore sought to specify a corresponding operating method.

With respect to the braking system, this is achieved according to an aspect of the invention in that a first and a second control and regulating unit are provided, wherein the first control and regulating unit electrically controls the pressure supply device of the first brake circuit, and wherein the second control and regulating unit electrically controls the pressure supply device of the second brake circuit, and wherein the two control and regulating units are connected together via a data interface.

The dependent claims relate to advantageous embodiments of the invention.

An aspect of the invention is based on the consideration that the reliable provision of an active braking function is an extremely important requirement in by-wire braking systems. In particular in braking systems which are provided or optimized for automated driving functions, an uninterrupted provision of the active braking function is necessary. This concerns in particular braking systems which have no brake pedal.

It has now been found that this requirement can be fulfilled in that firstly, the electrical and hydraulic independence of the two brake circuits is systematically implemented, and secondly a control of hydraulic components of the two brake circuits by the still functioning components is possible. In this way, the braking system can always execute the functionality of a braking system with a pressure setting device. Via the data interface, each of the two control and regulating units can determine the state of the other unit, and on failure react accordingly and take over the supply to the failed brake circuit.

The braking system may thus perform active braking processes as long as at least one of the two brake circuits remains intact. A brake circuit is described as not intact if its control and regulating unit and/or pressure supply unit has failed, in particular if there is a malfunction in the electrical components.

Known simulator braking systems usually only have one electronic unit. This has the disadvantage that if the electronic unit is not serviceable, the system must switch to a so-called hydraulic fallback level with greatly reduced function scope. In the proposed braking system, separate electronic units, which can communicate with each other via a data interface, are assigned to the two hydraulic circuits.

Advantageously, the two brake circuits are connected in hydraulically isolatable fashion to two normally closed circuit switch-on valves, of which a first circuit switch-on valve can be controlled by the first control and regulating unit, and wherein a second circuit switch-on valve can be controlled by the second control and regulating unit. By opening a circuit switch-on valve, in targeted fashion a hydraulic connection of the two circuits can be achieved, so that the failed brake circuit can be supplied with pressure medium from the intact brake circuit. The arrangement of the two circuit switch-on valves is selected such that opening one of the two valves creates the circuit connection. For this, the two circuit switch-on valves are preferably connected together in parallel.

If one electronic unit has failed, the still intact electronic unit eliminates the dual-circuit structure and also operates the wheel brakes of the electrically failed brake circuit. For this, two normally closed circuit connecting valves are connected to the respective electronic units. Thus after failure of one electronic unit, all wheel brakes can be loaded with electronically adjustable brake pressure.

Known simulator braking systems have the further disadvantage that they work with single-circuit hydraulics in normal mode, which requires very intensive monitoring and a very rapid system reaction to faults such as hydraulic leaks. The proposed braking system uses dual-circuit hydraulics throughout in normal operation. The two brake circuits can only be connected together via normally closed solenoid valves, which however are never opened in normal operation. The dual-circuit structure means that a leak in one of the two hydraulic circuits cannot affect the other, so that in the unaffected hydraulic circuit, no special system reactions need be implemented when a leak occurs.

In a preferred embodiment, at least one outlet valve in the second brake circuit can be controlled by the first control and regulating unit, wherein at least one outlet valve in the first brake circuit can be controlled by the second control and regulating unit. Each of the two control and regulating units can thus actuate an outlet valve in the respective other brake circuit.

Preferably, precisely one outlet valve in the second brake circuit can be controlled by the first control and regulating unit, and precisely one outlet valve in the first brake circuit can be controlled by the second control and regulating unit. If the wheel brakes are assigned to the brake circuits by axle, in this way ABS control after a first failure becomes possible by axle. Known braking systems are configured such that an ABS control function is only available in a technically perfect and faultless state. For example, after the failure of an electrical on-board network or electronic unit, no ABS control function is available. Following the automotive trend for increasing the availability of important assistance functions such as ABS, in particular with respect to automated driving, technical improvements are necessary here.

The stability and steerability of the vehicle must be retained with high availability even if an electronic unit is no longer serviceable. In order to meet this new requirement, as described above, preferably one of the outlet valves of each hydraulic circuit is actuated by the electronic unit assigned to the respective other hydraulic circuit. The remaining functional electronic unit thus has both an inlet and also an outlet valve available for pressure modulation in the electrically failed hydraulic circuit. The above-mentioned normally closed circuit connecting valve serves as the inlet valve. This structure is provided in a symmetrical arrangement for both circuits. Thus even on failure of one electronic unit, an ABS control function per axle remains available. Thus even in the case of an arbitrary electrical fault, the stability and steerability of the vehicle are maintained.

Advantageously, a pedal feel simulator is provided. The braking system is here advantageously operated in a brake-by-wire operating mode. The pedal feel simulator can preferably be actuated by means of a brake pedal. The pedal feel simulator serves to give the driver a familiar or trusted pedal feeling on actuation of the brake pedal.

Advantageously, the brake pedal is coupled by means of a coupling rod to an axially movable simulator piston, wherein two in particular redundantly designed travel sensors are provided which measure the piston travel and/or pedal travel respectively. In this way, the driver's braking intention can be determined reliably. The pedal feel simulator is designed in dry configuration in a preferred embodiment.

Preferably, a first of the two travel sensors is connected to the first control and regulating unit on the signal input side, and a second of the two travel sensors is connected to the second control and regulating unit on the signal input side. Even on failure of one of the two control and regulating units, the other control and regulating unit can still evaluate the signal of the travel sensor to which it is connected, and from this determine the driver's braking intention.

In a preferred embodiment, the two pressure supply devices are configured as linear actuators.

In an alternative preferred embodiment, one pressure supply device is configured as a linear actuator and the other pressure supply device is formed as a pump. In this case, the circuit separation preferably takes place by means of two series-connected, normally open circuit separation valves.

In a further preferred embodiment, each of the two pressure supply devices is formed as a pump. Here, the circuit connection preferably takes place as described above using two parallel-connected, normally closed circuit switch-on valves.

The variant with the best functionality is the version of the braking system with two linear actuators. It allows convenient (almost soundless and virtually stepless) pressure setting by axle, and an electrical and hydraulic dual-circuit structure.

The variant with a linear actuator and a pump would use only the linear actuator in normal operation, and the pump would only be used as a supplement in the event of a fault or for brake control functions such as ABS or similar. This variant could in some cases be more economic insofar as the pump module is produced economically and more favourably than a linear actuator. The pump module may also serve as a modular supplement. The pump-pump variant would be a further alternative.

Preferably, two separate on-board networks are provided, wherein each control and regulating unit and/or pressure supply device is powered by one of the two on-board networks.

The wheel brakes are preferably divided between the two brake circuits by axle. For optimum distribution of brake force in normal braking, and in particular in vehicles which can also brake regeneratively on one or both axles, it is advantageous to be able to set the pressure conveniently by axle. The brake system advantageously provides two separate brake circuits with two separate pressure setting devices, which allow convenient pressure increase and pressure reduction by axle. By dividing the brake circuits by axle, the brake pressures can also be set optimally in vehicles with regenerative normal braking on one or both axles.

In a preferred embodiment, a brake master cylinder is connected to the wheel brakes in hydraulically isolatable fashion. In this case, a hydraulic-mechanical fallback level may be provided in which the driver displaces pressure medium into the wheel brakes by muscle power. Preferably in this case, a hydraulic pedal feel simulator is provided for the brake-by-wire operating mode.

With respect to the method, the object cited above is achieved according to an aspect of the invention in that on electrical failure of one brake circuit, in said failed brake circuit the pressure is controlled by actuation of a circuit connecting valve and an outlet valve by the control and regulating unit in the intact brake circuit, and wherein the pressure in the electrically intact brake circuit is controlled by means of two inlet valves and one outlet valve.

Advantageously, to build up pressure in the failed brake circuit, a pre-pressure is built up by the intact pressure supply unit in the intact brake circuit, wherein a circuit connecting valve is opened so the brake fluid flows into the failed brake circuit.

To dissipate pressure in the failed brake circuit, advantageously an outlet valve in the failed brake circuit is opened by the intact control and regulating unit.

To build up pressure in the intact brake circuit, advantageously brake fluid from the pressure chamber of the pressure supply device is conducted through at least one inlet valve into a wheel brake.

To dissipate pressure in the intact brake circuit, advantageously an outlet valve is actuated by the control and regulating unit of the intact brake circuit, wherein the inlet valve is opened of the brake circuit to which the intact outlet valve is assigned.

Preferably, in addition the inlet valve of the wheel brake is opened, which is assigned to the wheel brake with the failed outlet valve.

The pressure supply device is preferably configured as a linear actuator, wherein the actuator piston position is maintained during pressure dissipation.

The advantages of aspects of the invention lie in particular in that the proposed braking system is particularly suitable for vehicles with automated driving function. In comparison with known systems, it offers both improved normal function and improved function after the occurrence of a fault. The braking system is particularly suitable for applications in autonomous or highly automated driving.

The braking system according to an aspect of the invention, because of its dual-circuit structure, is more robust against possible faults and is also constructed such that relevant components can easily be monitored. Advantageously, the essential functions of almost all components are used in any case in normal mode and are thus constantly tested. A function not used in normal mode is the electric activation of the circuit connection, which is not considered susceptible to fault.

A disadvantage of known simulator brake systems is that the closing capacity of so-called pressure switch-on valves can only be monitored poorly. To test this, the pressure switch-on valve must be pressurized from the side facing away from the pressure setting device. This is not possible or only indirectly possible in known braking systems. In the braking system described, such a pressurization for testing the pressure switch-on valves can easily be achieved by means of the respective other pressure setting device, without pressure build-up in the wheel brakes or activation unit. For the corresponding test, the wheel inlet valves are closed so that a hydraulically stiff chamber is created which allows very short test periods.

BRIEF DESCRIPTION OF THE DRAWINGS

One exemplary embodiment of the invention will be described in greater detail with reference to a drawing, in which, in a highly schematic view:

FIG. 4 shows a braking system with two pressure sources in a fourth preferred embodiment.

DETAILED DESCRIPTION OF THE PREFERRED EMBODIMENTS

In all of the figures, identical parts are denoted by the same reference designations.

Figure 1:
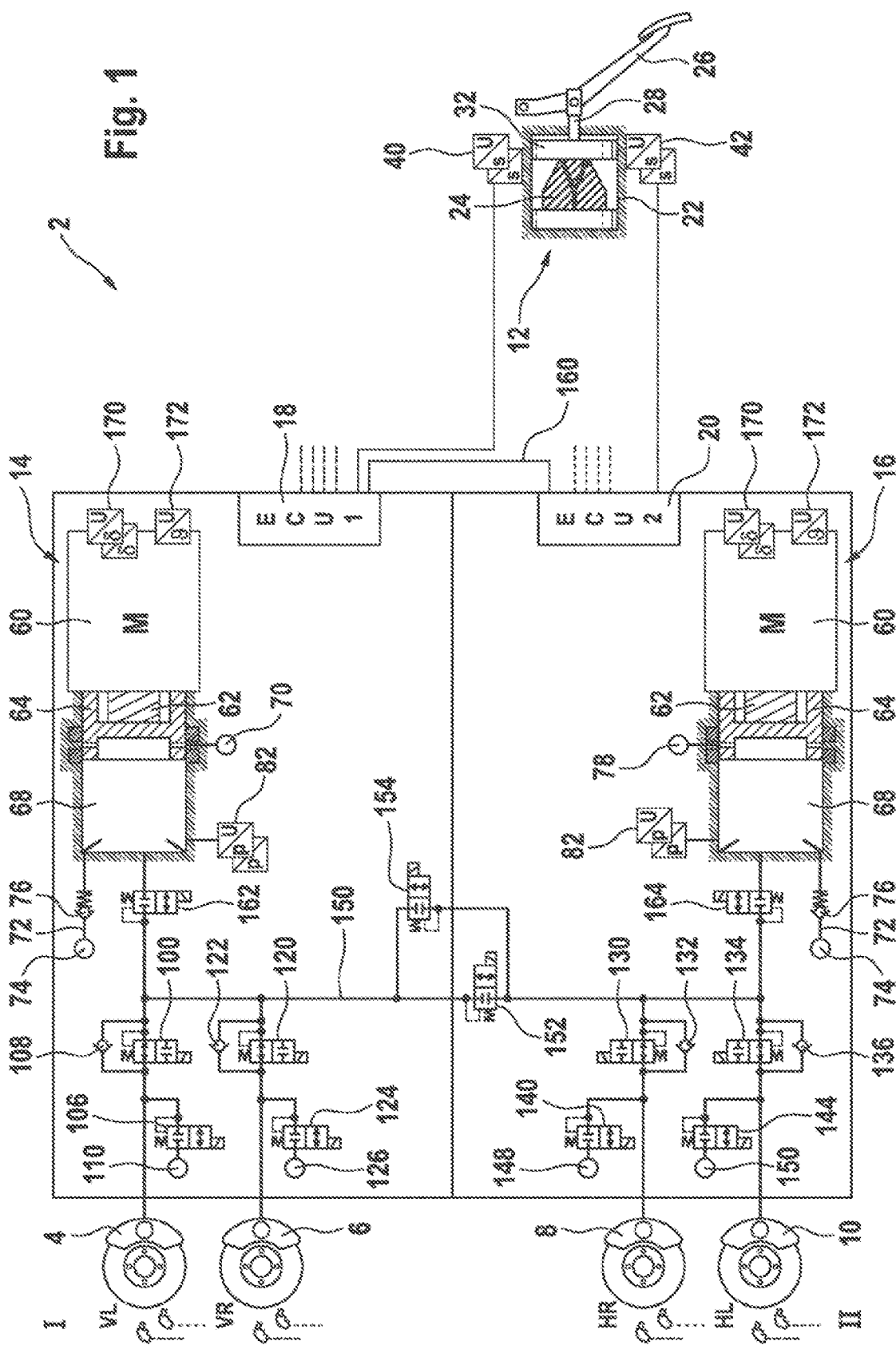
FIG. 1 shows a braking system with two pressure sources in a first preferred embodiment.

A braking system 2 shown in FIG. 1 comprises four hydraulically actuatable wheel brakes 4, 6, 8, 10, a pedal feel simulator or simulator 12, two pressure supply devices 14, 16, two electronic control and regulating units 18, 20, a pressure medium reservoir 22 (not shown) under atmospheric pressure.

The simulator 12 comprises a cylinder 22 in which an elastic simulator element 24 is arranged. A brake pedal 26 is connected to a simulator piston 32 via a piston rod 28, such that actuation of the brake pedal 26 from the rest position presses the simulator piston 32 against a simulator element 24, whereby the driver feels a counter-force. A pedal feel is advantageously simulated in this way. The simulator 12 is of dry design, i.e. it comprises no pressure chamber filled with pressure medium.

Two preferably redundantly designed travel sensors 40, 42 measure the piston travel of the piston 32 or the actuation travel of the brake pedal 26 respectively. One of the two travel sensors 40 is connected to a control and regulating unit 18 on the signal input side. The other travel sensor 42 is connected to the other control and regulating unit 20 on the signal input side. This ensures that on failure of one of the two sensors 40, 42, or one of the two control and regulating units 18, 20, the driver's braking intention can still be determined.

Both pressure supply devices 14, 16 are electrically actuatable and configured as linear actuators. For this purpose, the two pressure supply devices 14, 16 each have an electric motor 60, the rotational movement of which is converted by means of a schematically indicated rotation-translation mechanism 62 into a translational movement of a pressure piston 64, which, for the active build-up of pressure in the wheel brakes 4-10, is displaced into a hydraulic pressure chamber 68. The pressure chambers 68 are connected via a respective intake line 72 via a reservoir port 74 to the pressure medium reservoir 22, wherein, in each case between the pressure chamber 68 and the intake line 72, a check valve 76 is arranged which permits a flow of pressure medium from the pressure medium reservoir 22 into the pressure chamber 68 and which blocks in the opposite direction. A preferably redundantly designed pressure sensor 244 measures the pressure in the pressure chamber 68.

The braking system 2 comprises two brake circuits I, II. A first brake circuit I comprises the wheel brakes 4, 6; a second brake circuit II comprises the wheel brakes 8, 10. In the preferred embodiment shown, the wheel brake 4 is the left front wheel brake, wheel brake 6 is the right front wheel brake, wheel brake 8 is the right rear wheel brake, and wheel brake 10 is the left rear wheel brake. The division of the brake circuits 4-10 is accordingly "black-white", or by axle.

A normally open inlet valve 100 and a normally closed outlet valve 106 are arranged in a hydraulic connection between the pressure chamber 68 of the pressure supply device 14 and the wheel brake 4. A check valve 108, which blocks a flow of pressure medium from the pressure chamber 68 in the direction of the wheel brake 4 and permits this in the opposite direction, is connected in parallel with the inlet valve 100. The outlet valve is connected to the pressure medium reservoir via a reservoir port 110. In the same way, an inlet valve 120 with parallel-connected check valve 122, and an outlet valve 124 with reservoir port 126, are arranged in a hydraulic connection between the pressure chamber 69 of the pressure supply device 14.

In the same way, in brake circuit II, a respective inlet valve 130, 134 with parallel-connected check valve 132, 136, and a respective outlet valve 140, 144 with reservoir port 148, 150, are arranged in a connecting line between the pressure chamber 68 of the pressure supply device 16 and the respective wheel brake. In this way, the braking system 2 allows brake pressure to be built up and dissipated per individual wheel.

The pressure chamber 68 of the pressure supply device 14 can be hydraulically connected to the wheel brakes 4, 6 of the brake circuit I via a normally closed pressure switch-on valve 162. The pressure chamber 68 of the pressure supply device 16 can be hydraulically connected to the wheel brakes 8, 10 of the brake circuit via a normally closed pressure switch-on valve 164.

In unactivated state, or in the starting position of the piston 64, the pressure chamber 68 of the pressure supply device 14 is connected to the brake fluid reservoir via a reservoir port 70. Also in this state, the pressure chamber 68 of the pressure supply device 16 is connected to the brake fluid reservoir via a reservoir port 78. Accordingly, the linear actuators comprise snifter holes with reservoir connection which, in the actuator neutral position, allow balancing of the pressure and volume to the reservoir for both brake circuits I, II. This is also the case for the wheel brakes 4, 6, 8, 10, since during operation or during a brake pressure setting, the actuator switch-on valves 162, 164 are opened.

In the pressure supply device 14, the rotor position of the motor 60 is measured by means of a preferably redundantly designed rotor position sensor 170. An optional, preferably redundantly designed sensor 172 measures the temperature of the motor winding. In the pressure supply device 16, the rotor position of the motor 60 is measured by means of a preferably redundantly designed rotor position sensor 170. An optional, preferably redundantly designed sensor 172 measures the temperature of the motor winding.

The brake circuits I and II are connected together in hydraulically isolatable fashion. For this, a normally closed circuit connecting valve 152, to which a further normally closed circuit connecting valve 154 is connected in parallel, is arranged in a hydraulic connecting line 150.

In the braking system 2 shown, the two separate control and regulating units 18, 20 or electronic units are assigned to the two hydraulic circuits or brake circuits I, II. The two control and regulating units 18, 20 can communicate with each other via a data interface 160. If one electronic unit has failed, the still intact electronic unit eliminates the dual-circuit structure and also operates the wheel brakes of the electrically failed brake circuit I, II. For this, it opens a circuit connecting valve 150, 152 and also operates the wheel brakes 4, 6; 8, 10 of the electronically failed brake circuit I, II.

In each of the two brake circuits I, II, one of the two outlet valves 106, 124, 140, 144 can be actuated by the control and regulating unit 18, 20 of the respective other brake circuit I, II. For example, the outlet valve 106 is actuated by the control and regulating unit 20, and the outlet valve 140 is actuated by the control and regulating unit 18. Thus after failure of one of the two electronic units, all wheel brakes 4-10 can be loaded with an electronically adjustable brake pressure.

The braking system 2 shown in FIG. 1 is particularly suitable for vehicles with full automation of the driving function (level 4 or 5). For vehicles without brake pedal, the brake pedal 26 shown and/or the simulator 12 may be omitted. Known simulator braking systems have the disadvantage that during a refill process for refilling a linear actuator pressure chamber, no system pressure can be provided. It is therefore not possible to increase the wheel brake pressures in this phase. In the braking system shown in FIGS. 1 and 2, the system pressure is provided uninterruptedly. If refilling is required for a linear actuator, its pressure switch-on valve 162, 164 is closed and the circuit connection is created by opening at least one circuit connecting valve 152, 154. Thus in this time, the respective other linear actuator can provide the system pressure for all wheel brakes 4, 6, 8, 10. The states of the two ECU's and their connected actuators are exchanged via the data interface 160. Also, information on brake regulating functions and required braking instructions from the brake pedal, autopilot or other vehicle systems, is exchanged and adapted.

Figure 2:
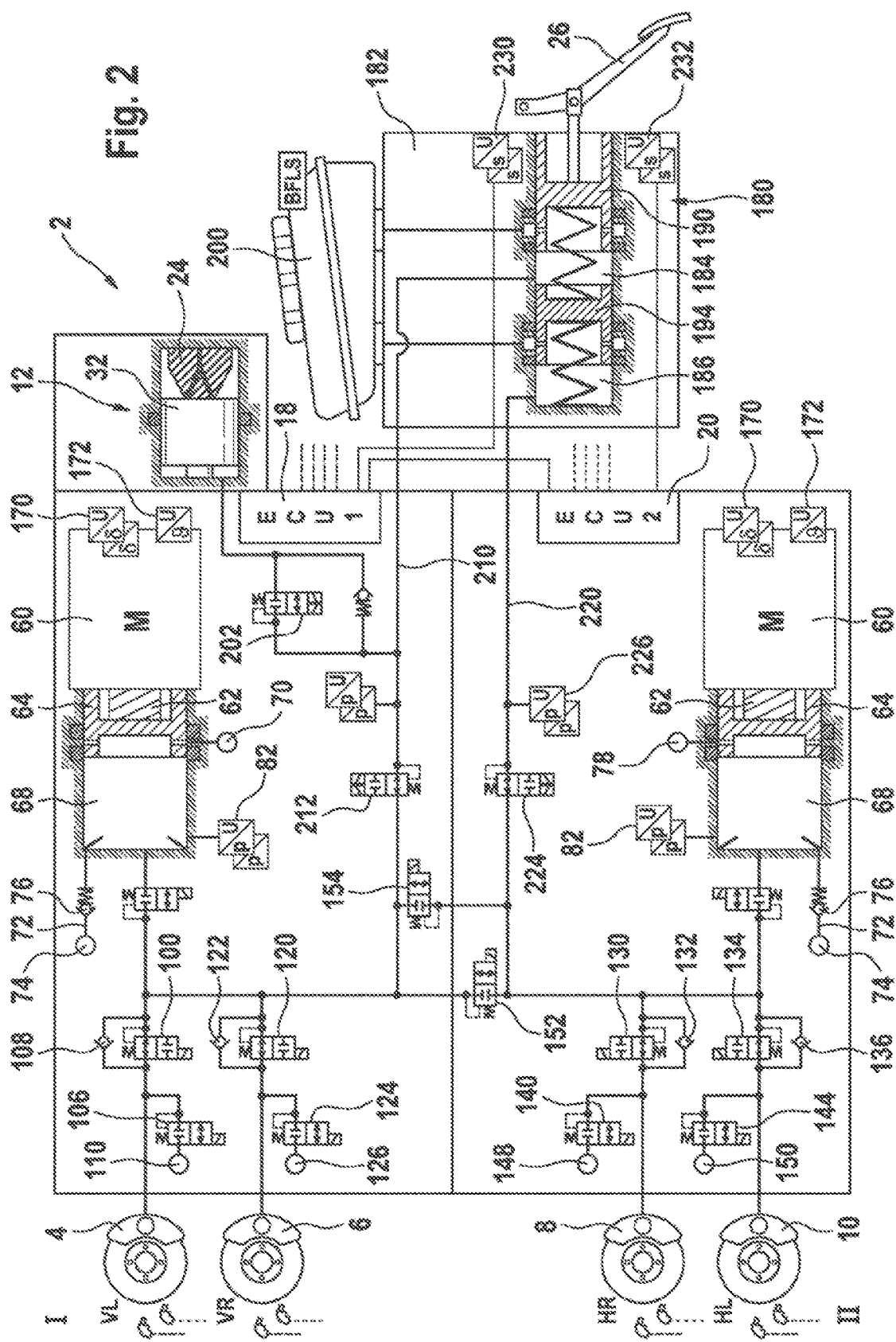
FIG. 2 shows a braking system with two pressure sources in a second preferred embodiment.

FIG. 2 shows a preferred variant of a braking system with a hydraulically connected tandem master brake cylinder (THZ) 180 which can be actuated by the brake pedal 26. The tandem master brake cylinder 180 comprises two pressure chambers 184, 186 arranged in a housing 182, namely the primary pressure chamber 184 and the secondary pressure chamber 186. The primary pressure chamber 184 is delimited by a primary piston 190 that can be actuated by means of the brake pedal 26, and the secondary pressure chamber 186 is delimited by a secondary piston 194 of floating design. In the unactivated state of the primary piston 190, the primary pressure chamber 184 is connected to a brake fluid reservoir 200. In the unactivated state of the secondary piston 194, the secondary pressure chamber 18 is connected to the brake fluid reservoir 200.

In the present exemplary embodiment, the simulator 12 is hydraulic. It can be connected hydraulically to the primary pressure chamber 184 via a simulator valve 202. In by-wire operating mode, the hydraulic connection of the tandem master brake cylinder 180 to the wheel brakes 4, 6, 8, 10 is blocked and a hydraulic connection to the simulator 12 is created. If both electronic units or control and regulating units are inactive, the driver can actuate the wheel brakes 4, 6, 8, 10 directly hydraulically.

The primary pressure chamber 184 can be connected to the brake circuit I via a primary line 210, and in by-wire mode can be blocked by a normally open isolating valve 212. A preferably redundantly designed pressure sensor 216 measures the pressure in the primary pressure chamber 184. The secondary pressure chamber 186 can be connected to the brake circuit I via a secondary line 220, and in by-wire mode can be blocked by a normally open isolating valve 224. A preferably redundantly designed pressure sensor 226 measures the pressure in the secondary pressure chamber 186.

To detect the driver's braking intention, preferably redundantly designed travel sensors 230, 232 are provided for measuring the pedal travel and/or travel of the primary piston 190. Each of the two sensors 230, 232 is connected to another control and regulating unit 18, 20 on the signal input side. This embodiment of the braking system 2 is necessary in particular also for vehicles which offer no redundant energy supply for the two ECU's and pressure setting devices, since here on occurrence of a fault, namely the failure of the energy supply, only hydraulic actuation by the driver is still possible.

Figure 3:
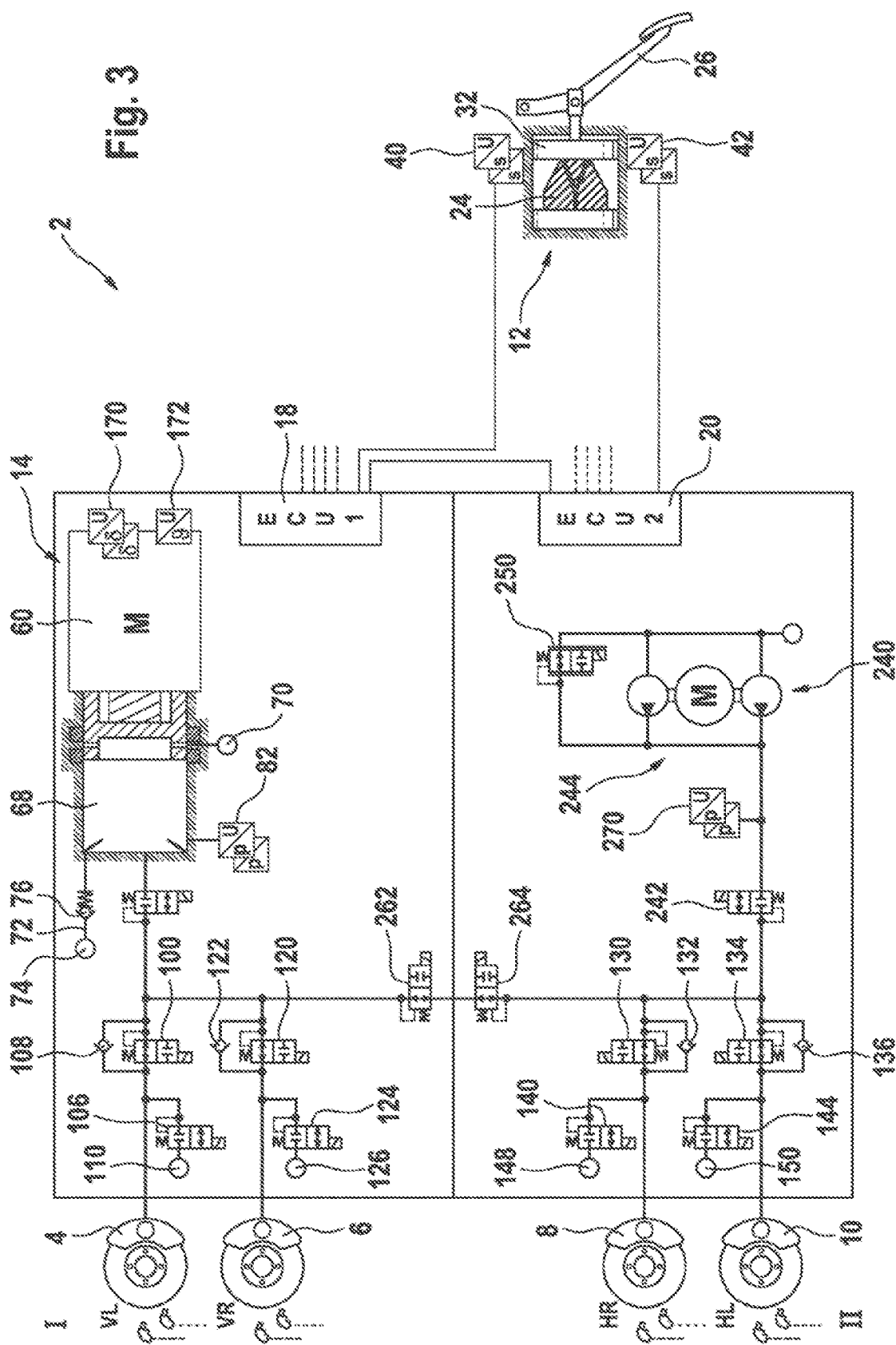
FIG. 3 shows a braking system with two pressure sources in a third preferred embodiment.

FIG. 3 shows a preferred embodiment of the braking system 2 with asymmetric configuration of the pressure setting device. Here, a pressure setting device or pressure supply device 14 is configured as a linear actuator, and a pressure supply device 240 as a combination of a pump 244 driven by electric motor and of a pressure control valve 250. The pressure provided on the pump pressure side is measured by means of a preferably redundantly designed pressure sensor 270. Furthermore, a switch-on valve 242 is provided.

In this variant, the circuit separation of the brake circuits I, II takes place via series-connected, normally open solenoid valves or circuit separating valves 262, 264. In normal operation, these remain open and the linear actuator provides the system pressure for all wheel brakes 4, 6, 8, 10. Whereas in the variants shown in FIGS. 1 and 2, the circuit separation is present in normal operating mode, here it may be provided by closing one of the two circuit separating valves 262, 264 in order to obtain the advantageous functionalities described above.

FIG. 4 shows a preferred embodiment of the braking system 2, similar to FIG. 1 but with pressure supplied by means of two pumps 240, 280. In this variant, both pressure supply devices are configured as pumps 240, 280. The circuit separation takes place, as shown in FIG. 1, by means of two parallel-connected, normally closed circuits switch-on valves 152, 154.

The invention claimed is:

1. A braking system comprising four hydraulically actuatable wheel brakes, wherein one normally closed outlet valve is assigned to each wheel brake and one normally open inlet valve is assigned to each wheel brake, wherein two pressure supply devices are provided for active pressure build-up in the wheel brakes, wherein a first brake circuit and a second brake circuit are hydraulically configured with two wheel brakes of the four hydraulically actuatable wheel brakes, respectively, wherein a first pressure supply device is hydraulically connected to the two wheel brakes of the first brake circuit and a second pressure supply device is hydraulically connected to the two wheel brakes of the second brake circuit, wherein a first and a second control and regulating unit are provided, wherein the first control and regulating unit electrically controls the pressure supply device of the first brake circuit, and wherein the second control and regulating unit electrically controls the pressure supply device of the second brake circuit, wherein the two control and regulating units are connected together via a data interface, and wherein the two brake circuits are connected in hydraulically isolatable fashion by way of two normally closed circuit switch-on valves, wherein a first normally closed circuit switch-on valve of two normally closed circuit switch-on valves is configured to be controlled by the first control and regulating unit, and wherein a second normally closed circuit switch-on valve of the two normally closed circuit switch-on valves is configured to be controlled by the second control and regulating unit, and wherein precisely one normally closed outlet valve of the normally closed outlet valves in the second brake circuit is configured to be controlled by the first control and regulating unit, and wherein precisely one normally closed outlet valve of the normally closed outlet valves in the first brake circuit is configured to be controlled by the second control and regulating unit.

2. The braking system as claimed in claim 1, wherein a pedal feel simulator is provided.

3. The braking system as claimed in claim 2, wherein the pedal feel simulator can be actuated by a brake pedal.

4. The braking system as claimed in claim 3, wherein the brake pedal is coupled by a coupling rod to an axially movable simulator piston, and wherein two redundantly designed travel sensors are provided which measure the piston travel and/or pedal travel respectively.

5. The braking system as claimed in claim 4, wherein a first of the two travel sensors is connected to the first control and regulating unit on the signal input side, and wherein a second of the two travel sensors is connected to the second control and regulating unit on a signal input side.

6. The braking system as claimed in claim 1, wherein the two pressure supply devices are configured as linear actuators.

7. The braking system as claimed in claim 1, wherein one pressure supply device of the two pressure supply devices is configured as a linear actuator, and wherein the other pressure supply device of the two pressure supply devices is formed as a pump.

8. The braking system as claimed claim 1, wherein two separate on-board networks are provided, and wherein each pressure supply device of the two pressure supply devices is powered by a respective one of the two on-board networks.

9. The braking system as claimed in claim 1, wherein the wheel brakes are hydraulically divided between the two brake circuits by axle.

10. The braking system as claimed in claim 1, wherein a master brake cylinder is connected to the wheel brakes in hydraulically isolatable fashion.

11. A method for operating the braking system as claimed in claim 1, wherein the two normally closed circuit switch-on valves are arranged in a hydraulic path between the first brake circuit and the second brake circuit and wherein on electrical failure of one brake circuit of the first brake circuit and the second brake circuit, in a failed brake circuit a pressure is controlled by actuation of one of the two normally closed circuit switch-on valves and an outlet valve of the at least one normally closed outlet valve in the first brake circuit or in the second brake circuit by the control and regulating unit in an electrically intact brake circuit, and wherein the pressure in the electrically intact brake circuit is controlled by two inlet valves of the at least one normally open inlet valve and one outlet valve of the at least one normally closed outlet valve in the first brake circuit or in the second brake circuit.

12. The method as claimed in claim 11, wherein to build up pressure in the failed brake circuit, a pre-pressure is built up by an intact pressure supply unit in the electrically intact brake circuit, and wherein one of the two normally closed circuit switch-on valves is opened so that brake fluid flows into the failed brake circuit.

13. The method as claimed in claim 11, wherein to dissipate pressure in the failed brake circuit, an outlet valve of the at least one normally closed outlet valve in the failed brake circuit is opened by an intact control and regulating unit.

14. The method as claimed in claim 11, wherein to build up pressure in the intact brake circuit, brake fluid from a pressure chamber of the pressure supply device is conducted through the at least one inlet valve into one wheel brake of the two wheel brakes.

15. The method as claimed in claim 11, wherein to dissipate pressure in the intact brake circuit, an outlet valve of the at least one normally closed outlet valve in the first brake circuit or in the second brake circuit is actuated by the control and regulating unit of the intact brake circuit, and wherein the inlet valve is opened of the wheel brake, to which an intact outlet valve is assigned.

16. The method as claimed in claim 15, wherein in addition, the inlet valve of the wheel brake is opened which is assigned to the wheel brake of the two wheel brakes with a failed outlet valve.

17. The method as claimed in claim 15, wherein at least one pressure supply device of the two pressure supply devices is configured as a linear actuator and wherein an actuator piston position is maintained during pressure dissipation.

* * * * *